June 2, 1970

B. E. PALMER 3,515,989

MAGNETIC ELECTRICAL TEST PROBES

Filed Feb. 2, 1968

INVENTOR
B.E. PALMER
BY
ATTORNEY

United States Patent Office 3,515,989
Patented June 2, 1970

3,515,989
MAGNETIC ELECTRICAL TEST PROBES
Burtis E. Palmer, Allentown, Pa., assignor to Western Electric Company, Incorporated, New York, N.Y., a corporation of New York
Filed Feb. 2, 1968, Ser. No. 702,734
Int. Cl. G01r 31/02
U.S. Cl. 324—72.5                                    2 Claims

ABSTRACT OF THE DISCLOSURE

Each one of a pair of electrical test probes has an elongated magnet affixed axially along its respective handle, so oriented that the test probes are attracted to each other. The probes can be used, at the option of an operator, (1) independently, one at a time; (2) one probe in each hand; and (3) both probes in the same hand, held selectively: parallel to each other, and pivotably about a pair of unlike magnetic poles of the magnets.

BACKGROUND OF THE INVENTION

This invention relates generally to articles for electrical test probing. More particularly, the invention relates to a pair of electrical test probes which are adapted for optional one-handed and two-handed usage of the test probes. With one-handed usage, the probes can be adjustably held. Accordingly, the general objects of the invention are to provide new and improved articles of such character.

In the testing of electrical circuitry, a contact point may be checked with a single test probe only, to compare the electrical potential at that point with a reference potential. On other occasions, it may be desirable to check the potential across two different contact points. Generally, the taking of a reading across a pair of contact points requires the use of two electrical test probes.

In the past, it has been the common practice to hold one test probe in one hand and another test probe in the other hand while a reading was being taken. Although, generally, each test probe in the past has included an insulated handle which houses a pointed metal tip for making electrical contact and an insulated wire electrically connected to the tip and through the handle for connection to suitable test circuitry, the taking of an electrical reading across a pair of contacts with both hands involves some hazard. If the hands should slip from the handles or if the insulation of the handles shall fail, the electrical potential being tested, or a portion thereof, might be imparted through the operator by way of both of his hands.

Techniques for one-handed measurements, using a pair of test probes held in one hand, have been burdensome in the past. A pair of probes could be held in one hand by permanently securing a pair of probes together at a pivot connection to provide for adjustability, such as set forth, for example, in French Pat. 358,934.

It is desirable to have a pair of test probes which can be operated, at the option of an operator: one probe at a time for testing the electrical values at one contact point; one test probe in each hand for testing the potential across a pair of contact points; and both test probes in one hand which can be easily manipulatable with the one hand to adjust the spacing between the tips of the probes.

SUMMARY OF THE INVENTION

Another object of this invention is to provide new and improved articles for testing electrical circuit elements. It is a further object of this invention to provide new and improved articles for both two-handed testing, and for one-handed testing across a pair of circuit contacts wherein the adjustment of the probes across the contacts is done with the one hand.

With these and other objects in view, the present invention contemplates utilization of a pair of electrical probes selectively suitable for one hand and two hand manipulation. Each probe includes an electrically insulated tubular handle having a metal tip affixed to one end thereof for making electrical contact with a circuit element being checked. The handle is adapted to have an electrical wire affixed to the tip for passage therethrough and out the other end thereof. Each probe has an elongated magnet affixed axially along the exterior surface of its respective handle, the magnetic poles of each magnet being oriented at opposite ends thereof. The magnet for one probe has its north magnetic pole affixed a distance X from its pointed tip and its south magnetic pole affixed a distance $X+L$ from its pointed tip. The magnet for the other probe has its south magnetic pole affixed the fixed distance X from the pointed tip thereof and its north magnetic pole affixed the distance $X+L$ from its respective tip. Thus, the pair of electrical probes can be used selectively so that they can be used independently one probe at a time, or one probe in each hand, or both probes in the same hand oriented selectively: parallel to each other, both probe ends pivoted about the magnetically attracted north pole on one magnet and the south pole on the other magnet, and vice versa.

BRIEF DESCRIPTION OF THE DRAWINGS

Other objects, advantages, and features of the invention will become apparent by reference to the following detailed specification and drawings of specific embodiments thereof, wherein.

DESCRIPTION OF PREFERRED EMBODIMENTS OF THIS INVENTION

Figure 1:
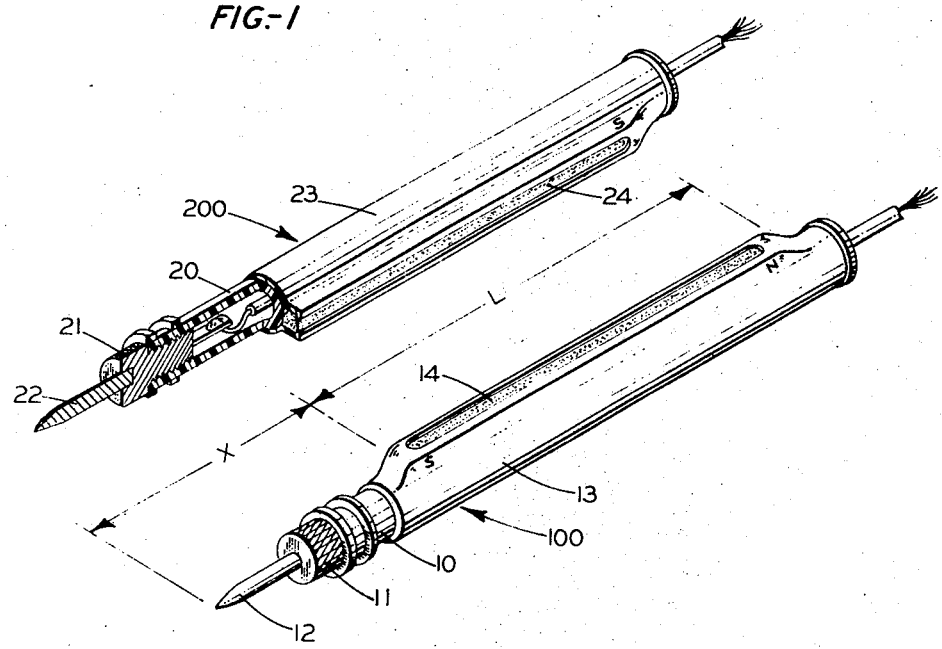
FIG. 1 is a perspective view, partly in cross section, of a pair of electrical test probes in accordance with one embodiment of this invention.

Referring to FIG. 1, there is shown a pair of similar electrical test probes 100–200. Each probe has a hollow insulating handle 10–20 of conventional design, composed of a suitable plastic material which houses a conductive metallic shank 11–21 having a pointed tip 12–22. Electrical cables (as shown in FIG. 1) can be coupled through the hollow handles 10–20 for contact with the respective shank 11–21 in any desired manner well known to the art.

An insulating jacket 13–23 encloses the respective handles 10–20 and affixes an elongated magnet 14–24 having magnetic poles at their respective ends axially on one side of the respective handle 10–20. The magnets 14–24 can be constructed of suitable magnetic material. Magnetic rubber may be desirable due to its insulative properties.

The magnet 14 is oriented with respect to the handle 10 so that its north pole is remote from the tip 12 and the south pole thereof is more closely adjacent thereto. In a similar but opposite manner, the magnet 24 has its south pole oriented with respect to the handle 20 remote from the tip 22 of the probe 200, its north pole being affixed closer to the tip 22. Hence, the magnets 14 and 24 are so poled that the probes 100–200 are attracted to each other, when aligned as shown in FIG. 1 and brought close to each other, with their respective pointed tips 12–22 in alignment.

Figure 2:
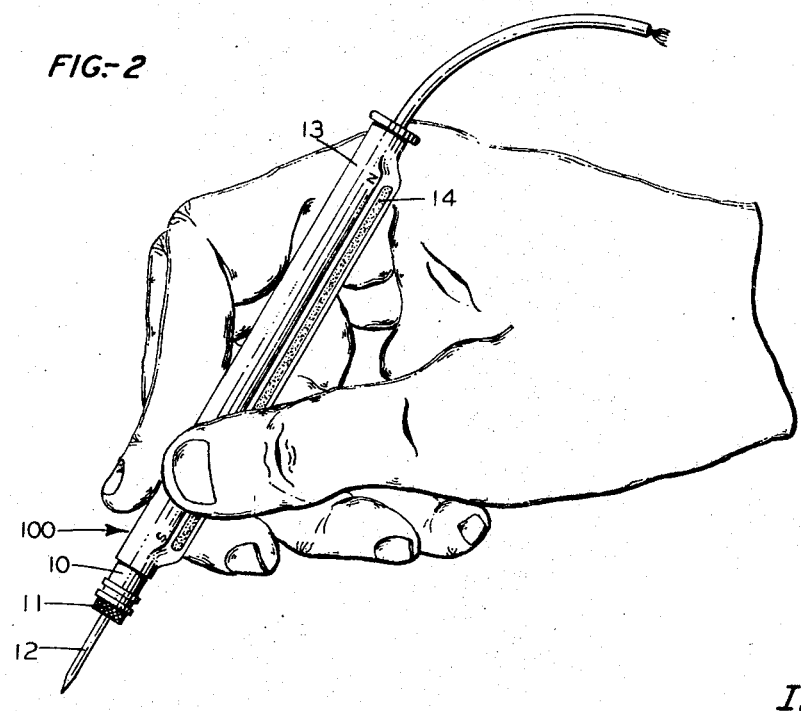
FIG. 2 is a pictorial view of one test probe, with a lead attached, held in the hand of an operator.

As shown in FIG. 2, a probe 100 can be used by itself with one hand for checking the electrical characteristics at a particular location. Such a probe, when used in one hand, operates in known manner. The magnet 14 has substantially no effect upon the operation of the test probe other than to change its substantially circular cross sectional configuration to the closed concavo-convex cross sectional configuration, approximating the shape of a keyhole, illustrated in the drawings. Such a probe, in the hands of an inexperienced operator, may provide for easier handling, since cylindrically-shaped probes have a tendency to slip in one's grasp.

Figure 3:
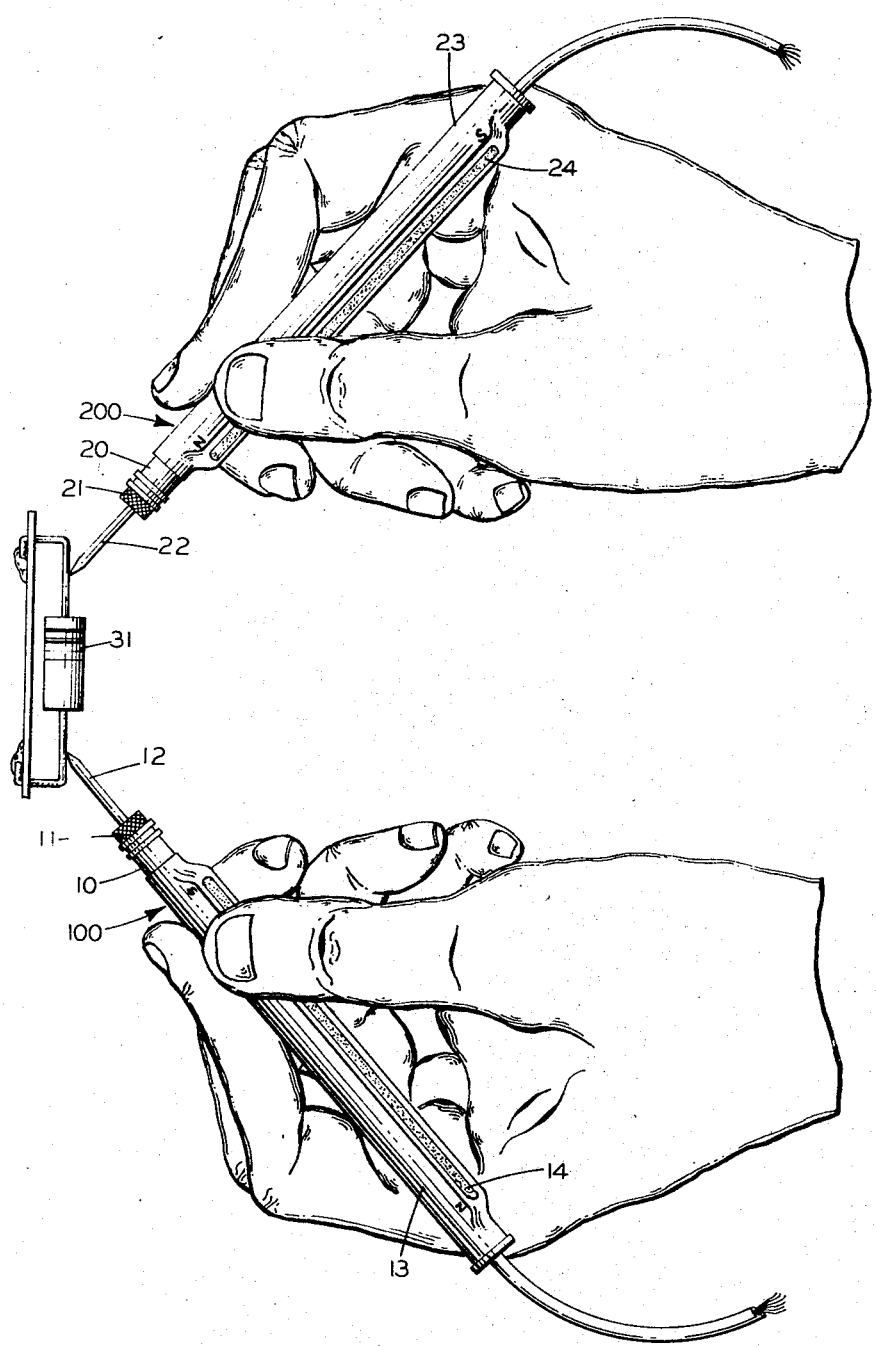
FIG. 3 is a pictorial view of both probes, held one in each hand, in accordance with a feature of the invention.

As shown in FIG. 3, both hands may hold the probes 100–200, one probe in each hand, for checking the electrical characteristics across the tips 12–22 of the probes 100–200. For example, as shown in FIG. 3, a resistor 31 can be checked to determine its electrical characteristics. As before, the manner of checking, and the general operation involved in using the two probes with both hands, are similar to that of the prior art.

Each probe 100–200 can be used individually for measuring the electrical potential at a given location. Both probes can be used, one in each hand, measuring the electrical potential across the two probes. Occasionally, however, it is desired to measure the voltage across a resistor, or other components, within an electrically hazardous area. When working within an electrically hazardous area, good safety practice, where possible, requires the use of one hand in lieu of two.

Figure 4:
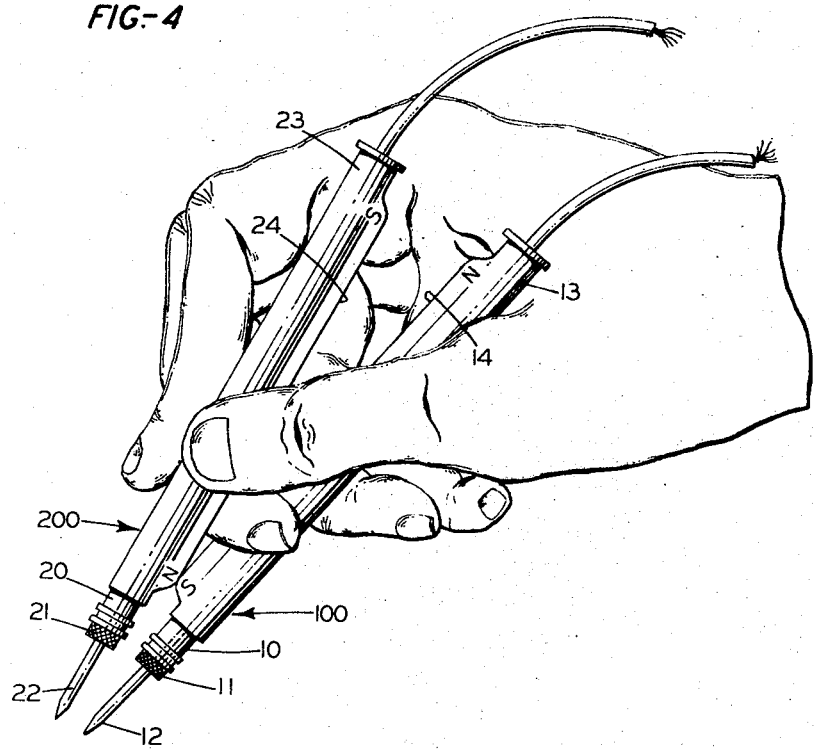
FIGS. 4, 5, and 6 are pictorial views showing both probes in the same hand, both probes being held in different positions in accordance with other features of the invention.

Referring to FIG. 4, both probes 100–200 are held in one hand with the tips 12–22 held in close proximity. The probes 100–200 are held in one hand and pivoted about the magnetically attracted south pole of the magnet 14 and the north pole of the magnet 24 of the probes 100–200. The middle finger of the one hand is placed between the two handles and is guided up and down along the handles to vary the acute angle created by the probes and the magnetic pivot point.

Figure 5:
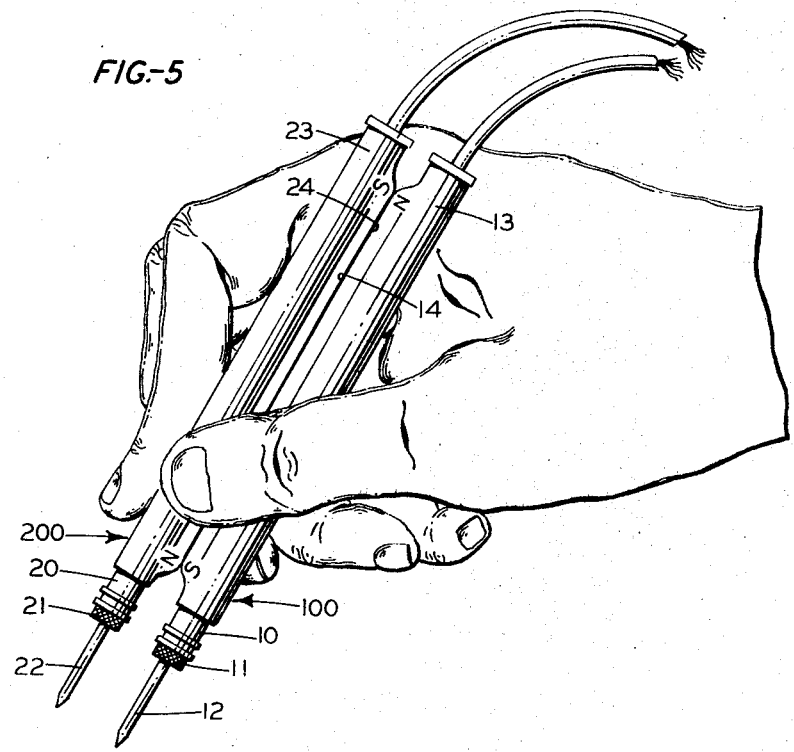

By removing the middle finger from between the two probes, the probes 100–200 can be held in one hand, magnetically attracted to each other and substantially parallel to each other, as shown in FIG. 5. As shown, the spacing between the two probes, and hence the two tips 12–22, is well defined in a manner so that the two tips 12–22 can be placed simultaneously upon a pair of equally spaced contact points for electrical testing.

Figure 6:
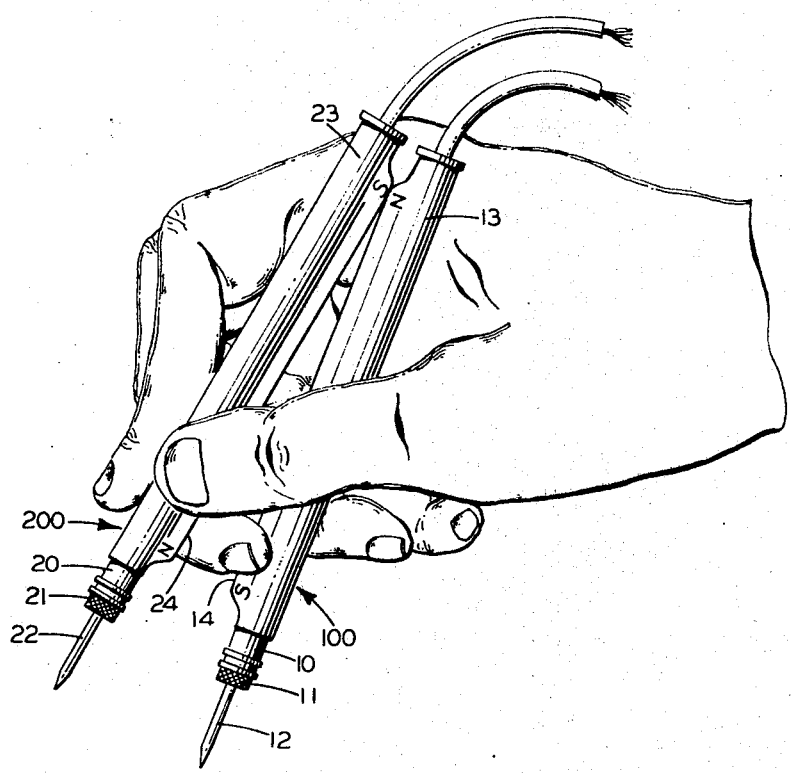

The spacing between the two tips 12–22 can be widened by inserting the middle finger between the two handles and by pivoting the handles about the north pole of the magnet 14 and the south pole of the magnet 24 as shown in FIG. 6.

The pair of magnetically attracted probes 100–200 can be operated in any manner convenient to the operator. The use of the middle finger is most convenient for most operators. However, the probes can be held in any manner that may appeal to the user, for example, they may be held in a chopstick fashion.

Preferably, the probes 100–200 can be distinguished by handles having contrasting colors, such as red and black, a red probe having the opposite magnetic characteristics from a black probe so that the two attract one another. Traditionally, the red probe can be used for connection to a positive potential, while the black probe is coupled to a negative source.

Thus, a new article has been set forth, namely, a pair of magnetically attractive test probes which can be used individually or cooperatively in the manner herein described.

It should be apparent that the above-identified embodiments are simply illustrative of the principles of the invention and numerous modifications may be devised without departing from the spirit and scope of the invention.

What is claimed is:

1. A pair of electrical probe devices selectively suitable for one hand and two hand manipulation, comprising:
 (A) (1) a first pointed metal tip for making electrical contact with a first circuit element being checked;
 (2) a first electrically insulated tubular handle, having said first metal tip affixed to one end thereof, for having an electrical wire affixed to said first tip for passage therethrough and out the other end thereof; and
 (3) a first elongated magnet having a length L affixed axially along the exterior surface of said first handle, the magnetic poles of said first magnet being oriented at opposite ends of said elongated magnet, said first magnet having its north magnetic pole affixed a first fixed distance X from said first pointed tip and its south magnetic pole affixed a distance $X+L$ from said first tip; and
 (B) (1) a second pointed metal tip for making electrical contact with a second circuit element being checked;
 (2) a second electrically insulated tubular handle, having said second metal tip affixed to one end thereof, for having an electrical wire affixed to said second tip for passage therethrough and out the other end thereof; and
 (3) a second elongated magnet having said length L affixed axially along the exterior surface of said second handle, the magnetic poles of said second magnet being oriented at opposite ends of said second elongated magnet, said second magnet having its south magnetic pole affixed said first distance X from said second pointed tip and its north magnetic pole affixed the distance $X+L$ from said second tip; whereby
 (C) said pair of electrical probe devices can be used selectively
  (1) independently, one probe device at a time;
  (2) one probe device in each hand; and
  (3) both probe devices in the same hand oriented, selectively,
   (a) both probe devices held parallel to each other;
   (b) both probe devices held pivoted about the magnetically attracted first magnet north pole and second magnet south pole; and
   (c) both probe devices held pivoted about the magnetically attracted second magnet north pole and first magnet south pole.

2. The electrical probe means as defined in claim 1 wherein said handles are of contrasting colors.

References Cited

UNITED STATES PATENTS

| | | |
|---|---|---|
| 2,547,248 | 4/1951 | Bartholomew. |
| 2,586,203 | 2/1952 | Boyle. |
| 2,709,245 | 5/1955 | Schneider _____ 339—12 |
| 2,721,717 | 10/1955 | Wales _____ 339—12 XR |
| 3,345,567 | 10/1967 | Turner _____ 324—158 |
| 3,408,562 | 10/1968 | Mazurkevics. |

RUDOLPH V. ROLINEC, Primary Examiner

E. L. STOLARUN, Assistant Examiner

U.S. Cl. X.R.

339—108; 324—149